United States Patent Office 3,397,005
Patented Aug. 13, 1968

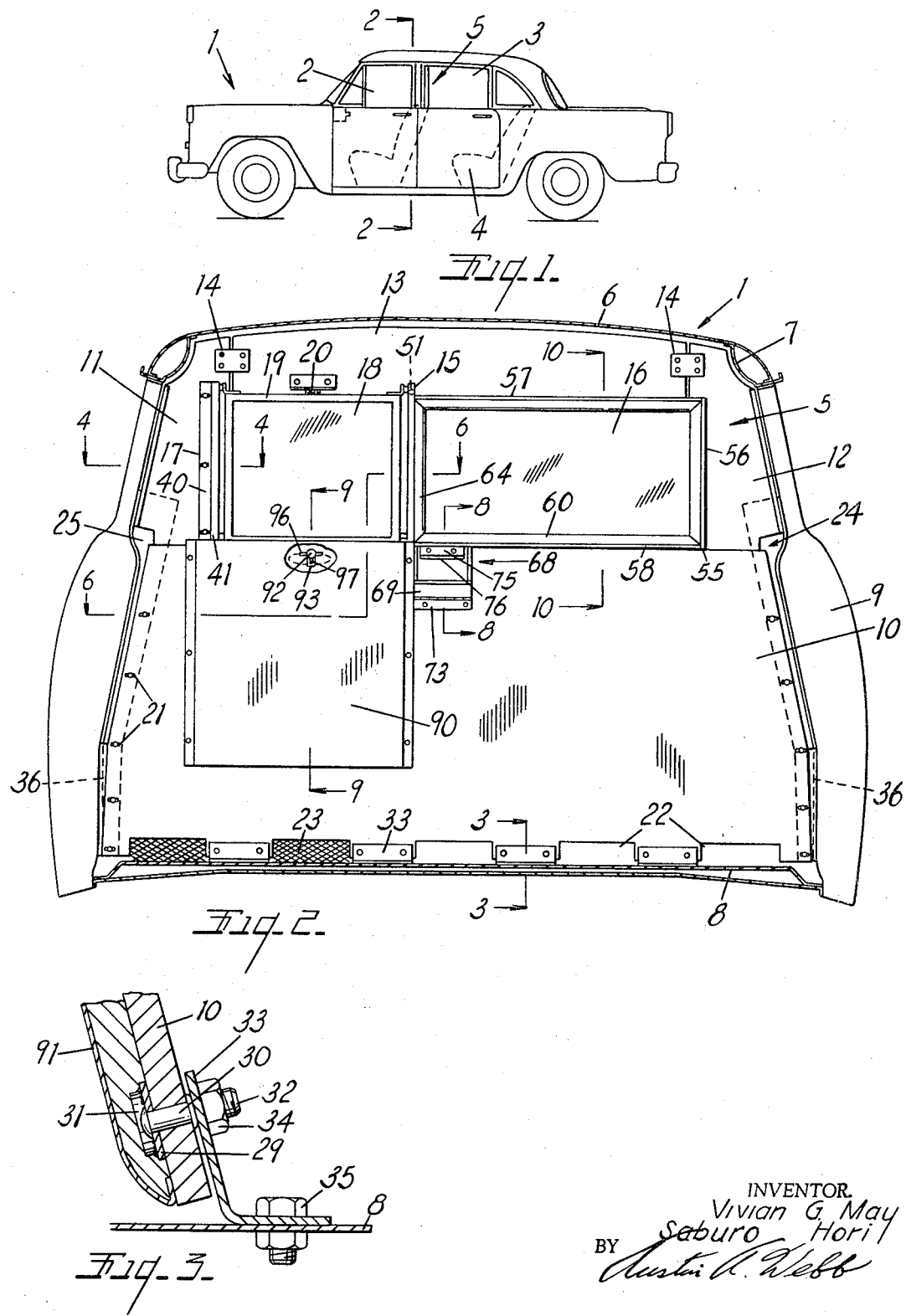

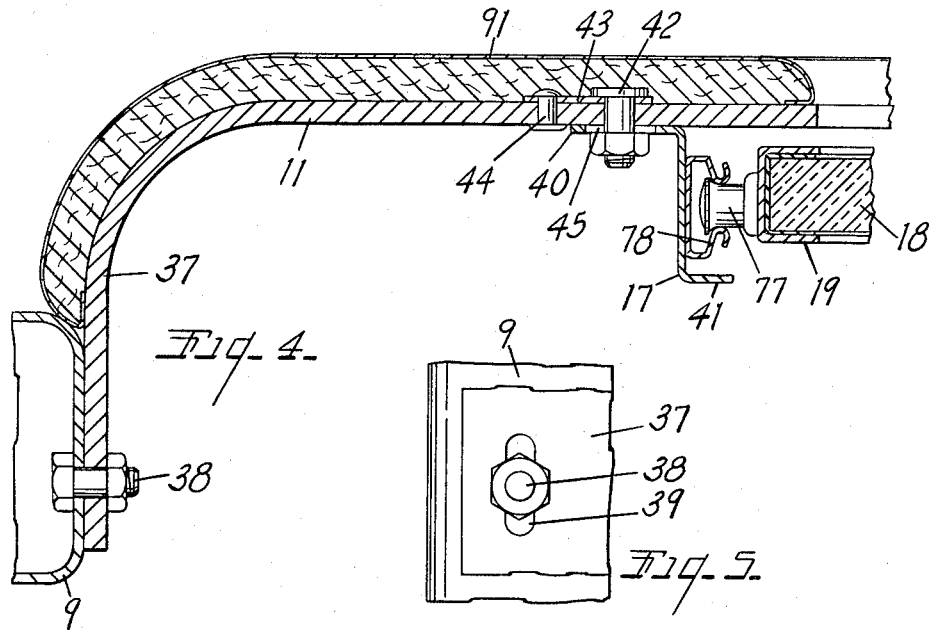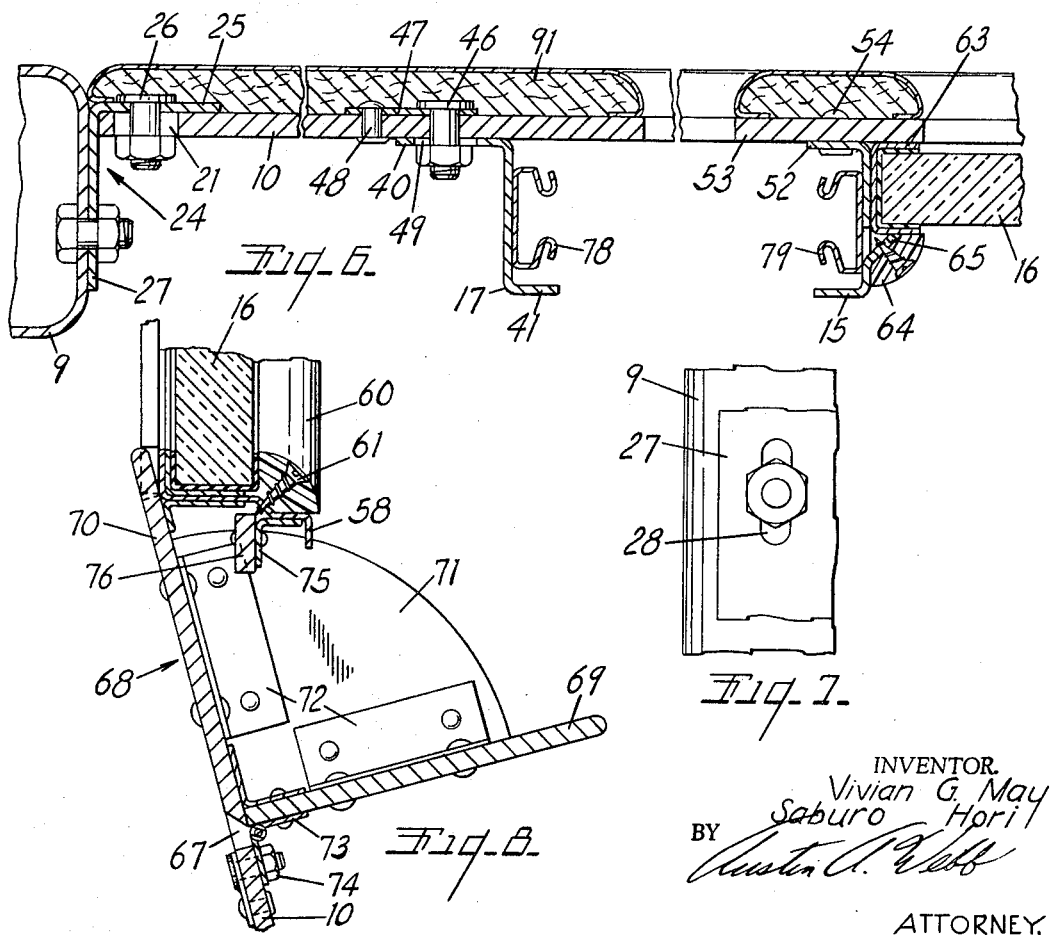

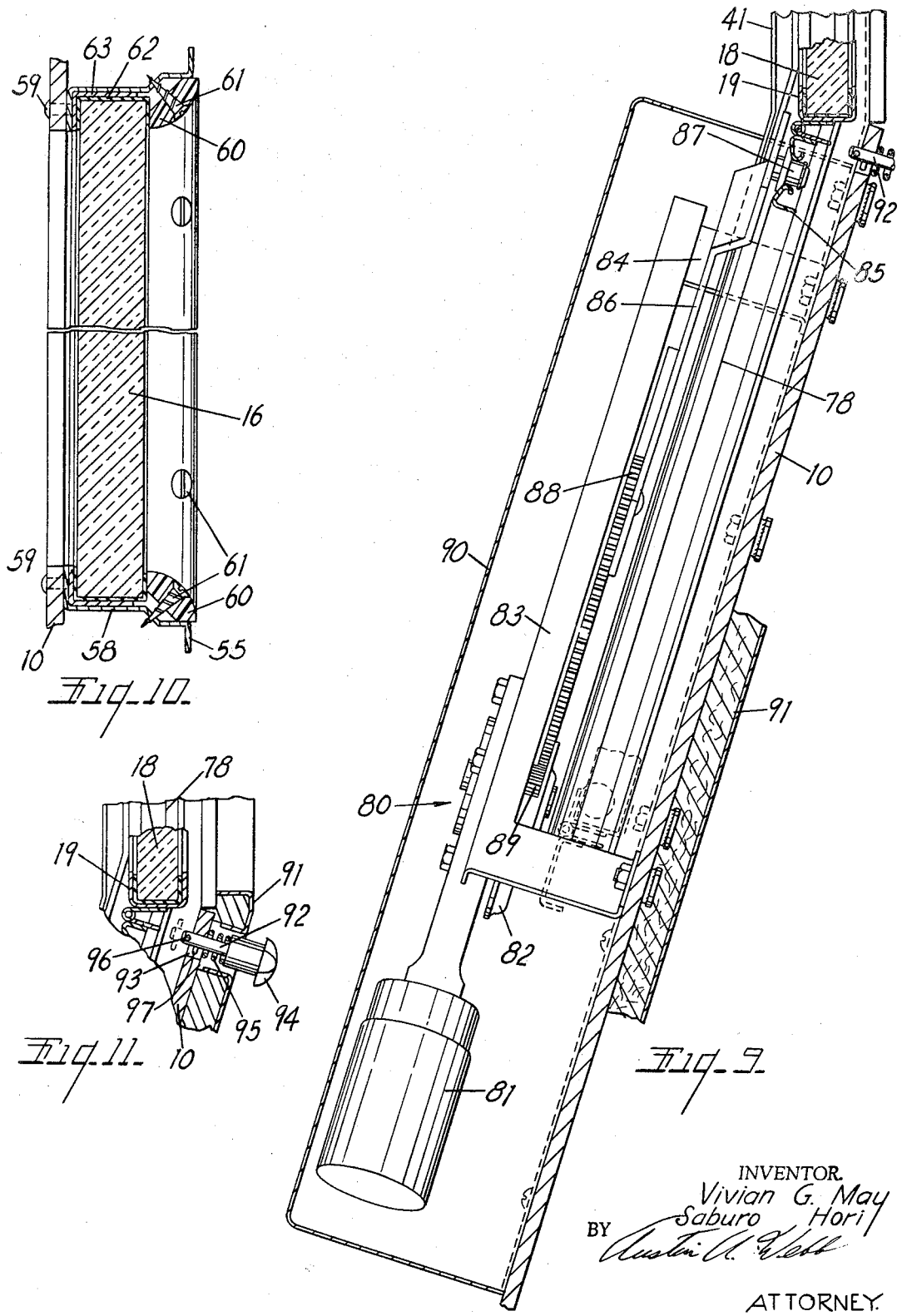

3,397,005
AUTOMOBILE WITH ROBBERY PREVENTING PARTITION
Vivian G. May, Augusta, and Saburo Hori, Kalamazoo, Mich., assignors to Checker Motors Corporation, Kalamazoo, Mich.
Filed Mar. 18, 1966, Ser. No. 535,554
16 Claims. (Cl. 296—24)

ABSTRACT OF THE DISCLOSURE

An assembly of inflexible bullet resistant panels located between the front and rear seats of an automobile and bridging the space between the floor, roof and door posts and including a transparent panel reciprocable in opening and closing relation to an opening in the assembly and having remote control operation means.

---

This invention relates to improvements in Automobile With Robbery Preventing Partition. The principal objects of this invention are:

First, to provide an automobile particularly a vehicle for hire such as a taxicab with a bullet resistant partition between the front and back seats to prevent the holdup or assault and robbery of the driver by preventing access of passengers in the back seat area to the driver's compartment.

Second, to provide an access limiting partition between the front and rear portions of an automobile having a movable bullet resistant panel which may be lowered or raised by the driver when he is apprehensive of assault or robbery by the passenger.

Third, to provide access limiting and bullet resistant partition for automobiles which may be installed in standard automobile bodies and fitted thereto to accommodate such variations in structure as occur in production of the bodies after the partition has been finished and upholstered as a unit.

Fourth, to provide an access limiting and bullet resistant partition for vehicles such as taxicabs having a money transfer receptacle movably mounted in the partition for the transfer of money therethrough without affording an opening through which a weapon may be passed or aimed in either direction.

Fifth, to provide a robbery preventing bullet resistant partition for taxicabs composed in part by relatively rigid nonferrous panels with fasteners secured to the panels and connectable to mounting brackets or portions of the vehicle after the heads of the fasteners, have been covered with a decorative covering so that the partition may be assembled as a unit, fitted to the vehicle and covered or upholstered as desired, and then firmly connected to the body of the vehicle.

Sixth, to provide a bullet resistant partition for taxicabs which includes a movable panel which may be opened or closed by the driver and which may be locked in closed position by a passenger in the rear seat who is apprehensive of being robbed or attacked by the driver.

Other objects and advantages of the invention will be apparent from the consideration of the following description and claims.

FIGURE 1 is a side elevational view of an automobile such as is commonly used as a taxicab.

FIGURE 2 is a fragmentary vertical transverse cross sectional view through the vehicle taken along the plane of the line 2—2 in FIGURE 1.

FIGURE 3 is a fragmentary longitudinal cross sectional view taken along the plane of the line 3—3 in FIGURE 2 illustrating a detail of the connection between the partition of the invention and the floor of the vehicle.

FIGURE 4 is a fragmentary horizontal cross sectional view through the partition and the adjacent portion of the vehicle body taken along the plane of the line 4—4 in FIGURE 2.

FIGURE 5 is a fragmentary side elevational view of the connection between the partition and the vehicle body shown in FIGURE 4.

FIGURE 6 is a fragmentary horizontal cross sectional view through the partition and the adjacent portion of the body taken along the plane of the line 6—6 in FIGURE 2.

FIGURE 7 is a fragmentary side elevational view of the connection shown in FIGURE 6.

FIGURE 8 is a fragmentary vertical cross sectional view through the money transfer receptacle and taken along the plane of the line 8—8 in FIGURE 2.

FIGURE 9 is a fragmentary vertical cross sectional view through the movable panel of the partition taken along the plane of the line 9—9 in FIGURE 2.

FIGURE 10 is a fragmentary vertical cross sectional view through the fixed transparent panel of the partition taken along the plane of the line 10—10 in FIGURE 2.

FIGURE 11 is a fragmentary view of a portion of FIGURE 9 showing the lock operable from the rear seat more completely.

The automobile or vehicle generally indicated at 1 is of conventional construction and is usable either as a private vehicle or as a taxicab. When used as a taxicab the front seat area forms a driver's compartment 2 and the rear seat area forms a passenger compartment 3 to which access is had through the rear doors 4 as will be understood. Taxicab drivers have frequently been robbed by persons who ask to be driven to a secluded address and then assault or holdup the driver by reaching from the passenger compartment 3 into the driver's compartment 2 or by threatening the driver with a weapon such as a pistol from the passenger compartment. The present invention provides an access limiting and bullet resistant partition indicated at 5 which is fixedly mounted within the body 1 between the driver's compartment and the passenger compartment to prevent such assaults and holdups.

The particular construction of the body 1 as illustrated in the drawings is generally conventional and intended only as illustrative of an example of vehicle body structure to which the partition may be adapted. As illustrated, the body comprises a top panel 6 extending transversely between longitudinal side rails 7 and a bottom panel or floor 8. Intermediate of the body between the doors, the rails 7 are connected to the floor by center posts 9 which are usually of hollow box section and which support hinges for the rear doors and latches for the front doors as is common.

The partition 5 comprises a lower wall 10 consisting of relatively rigid bullet resistant material such as an aluminum alloy or other suitable material. The panel extends generally across the body of the vehicle below the level of the windows and approximates the shape of the vehicle with sufficient clearance between the panel and the body as will be described. Above the left end of the wall 10, as viewed in FIG. 2, there is provided an upper side member 11 also of rigid bullet resistant material and a corresponding upper side member 12 is positioned over the right side of the lower wall. An upper crosspiece or wall 13, also of bullet resistant material is connected to and extends between the opposed inner edges of the members 11 and 12. Suitable connecting plates or other fasteners 14 connect the top cross wall to the upper side members. An upright post or member 15 bridges the opening between the lower wall and the top wall between the side edges thereof and a fixed transparent panel or window 16 of bullet resistant glass is mounted on the right side of the partition. Note that FIGURE 2 is a view looking rearwardly in the body so the window 16 is located behind the normal drivers position in the drivers compartment 2. A second upright rail or member 17 extends along the transverse inner edge of the upper side member 11 and the front surface of the lower wall 10 to coact with the upright 15 in supporting slideways or guide rails for a movable panel or closure 18. The panel 18 is also desirably formed of bullet resistant glass and is provided with a border frame 19. A stop 20 which limits the upward movement of the panel 18 is carried on the forward side of the top cross wall 13.

The bottom wall 10 is provided along its upright edges with vertically spaced laterally extending fastener receiving openings or slots 21 which appear in greater detail in FIGURE 6. Along its lower edge the lower wall 10 is provided with spaced notches or openings 22 for the purpose of ventilation and these openings may be covered with grills or screens 23 to prevent a weapon from being inserted through the openings. In order to connect the lower wall 10 to the floor and side posts 9 of a vehicle in which the spacing of the posts 9 may vary from vehicle to vehicle, the partition is provided with side connecting members, indicated generally at 24, and formed as sheet metal stampings that are relatively flexible as compared to the lower wall 10. The side connecting members have transversely extending flanges 25 having weld bolts 26 secured to their rear surfaces and positioned to project through the slots 21. Forwardly projecting flanges 27 have holes formed therethrough to register with openings in the side posts 9. As appears more clearly in FIG. 7 the openings in the flanges 27 are vertically elongated slots 28 so that the position of the side member may be adjusted to accommodate production variations in the positions of the side posts of the body.

At its lower edge the lower wall 10 is provided with weld bolt supporting strips 29 that are secured to the back side of the wall by rivets 30. The strips 29 are formed of steel so as to be capable of being welded to the heads 31 of weld bolts 32 because of the aluminum alloy of the lower wall is not easily welded. The bolts 32 project through the lower wall and are secured to the upstanding arms of angle brackets 33 by nuts 34 (see FIG. 3). The brackets 33 are bolted to the floor 8 as at 35. Because the lower wall 10 is inclined upwardly and rearwardly and lies in general crossing relation to the side posts 9, the side connecting members 24, 25 have forwardly turned flanges at their top and rearwardly turned flanges 36 near their bottom (see FIG. 2).

The left upper side member 11 has a rounded outer end terminating in a forwardly projecting flange or wall 37 which is secured to the post 9 by bolts 38 (see FIGS. 4 and 5). In order to permit fitting the upper side member to bodies which may vary somewhat in size and position of the bolt holes therein the wall 37 is provided with vertical slots 39 to receive the bolts in various positions. When installed the upper side member 11 rests on the upper edge of the lower wall 10 to form a substantially continuous bullet resistant shield.

The upper side member 11 is connected to the lower wall 10 by the upright 17 which is an L-shaped member, as shown in FIG. 4, having a laterally, outwardly turned flange 40 and an inwardly turned flange 41. The upper side member is provided with weld bolts 42 having their heads secured to strips of metal 43. The strips are secured to the back side of the upper side member by rivets 44 with the shanks of the bolts projecting through the bullet resistant material and horizontal slots 45 in the flange 40. The position of the upper side member may thus be adjusted relative to the upright 17 and the lower wall to obtain the desired fit in the body. The upright 17 extends downwardly and is angled forwardly along the front side of the lower wall 10 where it is secured by similar weld bolts 46 secured to strips 47. As with the upper side member the strips 47 are riveted to the lower wall as at 48 with the shanks of the bolts passing through horizontal slots 49 in the flange 40.

The top cross wall 13 is secured to the laterally inner edge of the upper side wall 11 by one of the fasteners 14 which is of relatively yieldable material which permits limited adjustment between the connected members in fitting the partition to the vehicle body. The cross wall 13 is also connected to the lower wall 10 by the upright 15 which is a channel shaped member as shown in FIG. 6. The upper end of the upright 15 is secured to the top cross wall by a fastener 51 similar to the weld bolts 42 and 46 which engages the rear flange 52 of the channels shaped upright. The lower end of the upright 15 is secured to the side of the lower wall 10 by similar fastenings, not illustrated. Between the top cross wall and the lower wall the upright 15 has a narrow strip 53 of bullet resistant material secured thereto as by the rivets 54, one of which is shown in FIG. 6.

The right upper side member 12 is connected to the right post 9 by connections similar to those which connect the left side member to the left post. The upper end of the right upper side member is connected to the right end of the top cross wall by the previously described connector plate 14 and the lower end of the right upper side member is connected to the top of the lower wall by mutual connection to the frame 55 of the window panel 16. The frame 55 consists of a right side portion 56, top portion 57 and bottom portion 58. As appears more clearly in FIGURE 10 the window frame portions are of L-shaped cross section arranged in over-lapping relation to the adjacent parts of the partition to which they are secured as by rivets 59.

The bulletproof panel 16 is retained in place against the inturned flanges of the L-shaped cross sections by molding strips 60 secured by screws 61. The panel 16 has a resilient gasket 62 around its edge and an angled metal frame 63. Along its left edge, the panel is held rearwardly against the front of armor strip 53 by a fourth molding strip 64. Lugs 65 struck from the web of the upright 15 provide connections for the screws which hold the left molding strip in position.

Adjacent to the upright 15, the upper edge of the lower wall 10 is provided with a downwardly extending notch 67 which forms a passage through the partition of the invention. Positioned within this notch is a money transfer receptacle indicated generally at 68. As appears more clearly in FIG. 8 the receptacle 68 has a front wall 69 and a rear wall 70 with arcuate side walls 71 connected thereto by angle clips 72. The front wall 69 is connected by a hinge 73 to the lower wall 10 with the lower leaf of the hinge bolted to the lower wall by weld bolt 74 similar to the weld bolts 42 and 46. The lower panel support bar or rail 58 extends across the top of the notch 67 and between the outer or upper edges of the receptacle walls 69 and 70. As appears more clearly in FIG. 8, and an angel clip 75 secured to the underside of the support bar carries a narrow strip 76 of bullet resistant material which projects downwardly between the side walls 71 to prevent a weapon from being directed effectively through the receptacle and receptacle opening when the receptacle is in partially open position on each side of the partition.

The movable transparent panel 18 and its retaining frame 19 are guided by pins 77 secured to the panel frame and engaged in guide tracks 78 and 79 secured to the opposed sides of the uprights 17 and 15. With reference to FIGS. 4 and 6 it will be noted that the bulletproof panel 18 overlaps the adjacent edges of the left upper side member 11 and the strip 53 of bullet resistant material to form an effective barrier when the panel 18 is raised. The mechanism for raising and lowering the panel 18 consists of a power window operator of well known form illustrated generally at 80 in FIG. 9. The window operator includes a driving motor 81 and gear box 82 mounted on a support plate 83 on the forward side of the lower wall 10. Legs 84 riveted to the front of the lower wall support the plate and the gear box in spaced relation to the front of the lower wall so that the panel 18 can be moved upwardly and downwardly in the tracks 78 by the driving hinge 85 secured to the bottom of the panel frame. A sector arm 86 is pivotally supported on the plate 83 and has a pin 87 drivingly engaged in the slotted leaf of hinge 85. Teeth 88 on the sector arm mesh with a pinion 89 in the gear box 82. The construction of the window operator is not disclosed or described in greater detail as such window operating mechanisms are well known. The motor 81 is desirably connected to a control within convenient reach of the driver of the vehicle. A protective cover or housing 90 is secured to the front of the lower wall over the window operator.

With the foregoing construction the partition consisting of the lower wall 10, left upper side member 11, right upper side member 12, top cross wall 13, fixed transparent panel 16 and the uprights 15 and 17 may be assembled as a unit. The movable panel 18 and the panel operator 80 may be installed then or later. The relatively rigid structure of the partition is inserted into the body of the vehicle and connected to the vehicle by hand tightening the nuts on the bolts 26, 38, 42 and 46 to fit the partition to the particular vehicle. After the partition is fitted by means of the necessary adjustments of position of the bolts in the slots 28, 39, 45 and 49, the panel can be removed for application of a desired paint finish on the front of the partition and by application of a decorative covering such as the upholstery 91 over the rear surface of the partition. The covering 91 thus covers all of the rivet and bolt head connections on the rear surface of the partition. This presents an attractive appearance in the rear passenger compartment of the vehicle. At the same time the bolts for connecting the partition in the particular vehicle are properly located and held against rotation so that the clamping nuts can be tightly and more or less permanently secured thereto when the partition is reinserted in the vehicle.

In order to permit the passenger of a taxicab to lock the movable partition 18 against possible assault by the driver there is provided a lock pin 92 passed through a keyhole opening 93 near the upper edge of the lower wall and between the tracks 78 and 79. The pin 92 has an operating handle 94 projecting into the passenger compartment and is biased rearwardly by a spring 95. A cross pin 96 prevents the lock pin 92 from being removed rearwardly while a guide pin 97 reciprocable in the stem of the keyhole slot is operative to hold the lock bolt in inwardly projected position when the handle 94 is pushed forwardly and rotated to engage the pin 97 over the front side of the lower wall 10. In its forwardly projecting position the lock pin 92 will obstruct and prevent downwardly opening motion of the movable panel 18. Thus a passenger who is apprehensive of a cab driver can ask that the panel 18 be raised prior to entering the cab and the passenger can then lock the partition closed making it impossible for the driver to rob the passenger without stopping and getting out of the cab. This affords considerable assurance to the passenger against robbery.

What is claimed as new is:
1. In an automobile having a body with a front driver's seat, a rear passenger seat, a floor and roof extending between said seats, and side door posts connecting said floor and said roof and located between said seats,
 a robbery preventing partition comprising a transverse lower wall of bullet resistant material,
 side connecting members having connections to the side edges of said lower wall and said posts,
 spaced upper side members of bullet resistant material connected to the top of said lower plate at the sides thereof and to said posts,
 a top cross wall of bullet resistant material connected to and extending between said upper side members in vertically spaced relation to said lower wall,
 a first rail connected in upright position between said cross wall and said lower wall in spaced relation between the side edges thereof,
 a second rail connected to said lower wall and one of said upper side members in parallel relation to said first rail,
 a first window of bullet resistant glass mounted between the upper portion of said lower wall and said top cross wall and extending between the other of said upper side members and said first rail,
 and a second window of bullet resistant glass vertically reciprocable between said rails to selectively close the remaining space between said top cross wall and said lower wall.

2. An automobile and partition as defined in claim 1 in which said side connecting members have vertically and horizontally adjustable connections to said posts and said lower wall.

3. An automobile and partition as defined in claim 2 in which said connection to said side connecting members include horizontal slots in the side edges of said lower wall receiving connecting bolts passed through said connecting members, and vertical slots in the connecting members receiving connecting bolts engaged with said posts.

4. An automobile and partition as defined in claim 3 in which said lower wall has finishing material attached to its rear side and extending over the ends of the bolts passed therethrough.

5. An automobile and partition as defined in claim 1 in which said lower wall has an opening formed therethrough, and a money transfer receptacle movable through said opening.

6. An automobile and partition as defined in claim 5 in which said opening is formed in the upper edge of said lower wall below said first window,
 said receptacle being an open topped box pivotally supported in said opening and having front, rear and side walls of bullet resistant material, with the front and rear walls swingable alternatively into closing relation in said opening.

7. An automobile and partition as defined in claim 6 in which there is a piece of bullet resistant material positioned to project into said receptacle and overlapping the edges of said front and rear walls.

8. An automobile and partition as defined in claim 1 in which the lower edge of said lower wall has ventilating openings formed therein,
 open mesh screens secured over said openings, and brackets secured to said floor and bolted to said lower wall between said openings and over the ends of said screens.

9. An automobile and partition as defined in claim 1 in which said windows overlap the adjacent edges of said lower wall, said side connecting members and said top cross wall,
 and a strip of bullet resistant material connected along said first rail and overlapping the adjacent edges of said windows.

10. An automobile and partition as defined in claim 3 in which said upper side members are curved transversely rearwardly and inwardly from said side posts and have vertical slots formed therein receiving the connections to the posts.

11. An automobile and partition as defined in claim 3 in which part of the connections to said lower wall and said upper side members and said top cross wall include bolts having heads welded to strips of metal with the strips riveted to the rear sides of the walls and side members and the bolts passed through holes in the bullet resistant material.

12. An automobile and partition as defined in claim 3 in which said side connecting members have laterally facing flanges on their outer edges conformed to the shape of lower parts of said posts,
 and transverse flanges on said side connecting members connected to said lower wall.

13. An automobile and partition as defined in claim 1 in which said lower wall has power operated means mounted on its front side and connected to reciprocate said second window,
    and a control connected to actuate said power operated means and positioned to be actuated by a driver in said driver's seat.

14. In an automobile having a body with a front drivers seat, a rear passenger seat, floor and roof parts extending between said seats, and side door posts parts connecting said floor and roof parts between said seats, a robbery preventing partition comprising,
    an assembly of relatively inflexible panels of bullet resistant material connected together and substantially bridging the space between said floor, roof and post parts,
    part of said assembly being transparent,
    side connecting members adjustably connected to the edges of said assembly,
    first connecting means adjustably engageable with said assembly and fixedly secured to the back side of said side connecting members,
    other connecting means adjustably engageable with said side connecting members and said posts, and a decorative covering on the back side of part of said assembly concealing said first connecting means.

15. An automobile and partition as defined in claim 14 in which said assembly has an opening formed therethrough,
    and a money transfer receptacle having bullet resistant walls movably mounted in said opening to open alternatively to said front seat and back seat while substantially closing said opening.

16. In an automobile having a body with a front drivers seat, a rear passenger seat, floor and roof parts extending between said seats, and side door post parts connecting said floor and roof parts between said seats, a robbery preventing partition comprising,
    an assembly of relatively inflexible panels of bullet resistant material connected together and substantially bridging the space between said floor, roof and post parts,
    said assembly including a transparent panel reciprocable in opening and closing relation to an opening in the assembly, and
    a selectively operable lock having a control operable from the back side of said partition and arranged to lock said reciprocable panel in closed position.

References Cited

UNITED STATES PATENTS

| 3,015,515 | 1/1962 | Halstead | 296—24 |
| 2,566,032 | 8/1951 | Poland | 296—24 |

FOREIGN PATENTS

| 1,159,792 | 12/1963 | Germany. |

PHILIP GOODMAN, *Primary Examiner.*